UNITED STATES PATENT OFFICE.

CHARLES P. HARRIS, OF RUTLAND, VERMONT.

FUEL-SAVING COMPOUND.

SPECIFICATION forming part of Letters Patent No. 685,719, dated October 29, 1901.

Application filed April 5, 1901. Serial No. 54,567. (No specimens.)

*To all whom it may concern:*

Be it known that I, CHARLES P. HARRIS, a citizen of the United States, residing in the city of Rutland, county of Rutland, and State of Vermont, have invented certain new and useful improvements in fuel-saving compounds to render the use of the fuel more economical by the help of gases generated by the compound; and I do hereby declare that the following is a full, clear, and exact description of the invention, which will enable others skilled in the art to which it appertains to use the same.

The invention is a new and useful improvement for aiding the combustion of anthracite and bituminous coal, coke, and charcoal and to render the use of the same more economical by the help of gases generated by the compound.

The object of my invention is to provide a compound easily and cheaply made which when sprinkled upon hard or soft coal, coke, and charcoal it will, first, intensify the heat from the fuel by consuming the gases generated by the mixture; second, make the combustion more gradual and complete; third, prevent the waste of unconsumed carbon, and, fourth, lessen the formation of soot, smoke, and injurious gases.

My compound consists of the following ingredients combined in the proportions stated: water, ninety-six gallons; salt, (chlorid of sodium,) twenty-four pounds; marble-dust, ten pounds; coal-dust, ten pounds; ashes of coke, ten pounds; ashes of wood, ten pounds; ashes of tanbark, ten pounds; sawdust, ten pounds; soap, seven pounds. The salt is mixed in half the water to make a brine. The soap is mixed in the balance of the water to produce a saponaceous effect. In the above mixed together the remaining ingredients after being thoroughly mixed with each other are poured into the water as prepared above, which is then ready to sprinkle upon the fuel in the proportion of four gallons to the ton of fuel.

Having thus described my invention and the method of application, what I claim is—

1. The herein-described composition of matter consisting of water, coal-dust, marble-dust, chlorid of sodium, soap, ashes of wood, ashes of coke, ashes of tanbark, and sawdust, substantially as described and for the purposes specified.

2. The herein-described coal-saving compound, consisting of: water, ninety-six gallons; coal-dust, ten pounds; coke-ashes, ten pounds; wood-ashes, ten pounds; tanbark-ashes, ten pounds; sawdust, ten pounds; soap, seven pounds; chlorid of sodium, twenty-four pounds; marble-dust, ten pounds, substantially as described.

In testimony whereof I have signed my name to this specification, in the presence of two subscribing witnesses, on this 26th day of March, 1901.

CHARLES P. HARRIS.

Witnesses:
   E. L. GRIMES,
   W. J. STEWART.